US012366527B2

(12) United States Patent
Okkonen et al.

(10) Patent No.: US 12,366,527 B2
(45) Date of Patent: Jul. 22, 2025

(54) METHOD AND APPARATUS FOR DETERMINING THE QUALITY OF FRESH CONCRETE OR THE LIKE

(71) Applicant: Teknologian tutkimuskeskus VTT Oy, Espoo (FI)

(72) Inventors: Matti Okkonen, Espoo (FI); Edgar Bohner, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 233 days.

(21) Appl. No.: 17/787,358

(22) PCT Filed: Dec. 18, 2020

(86) PCT No.: PCT/FI2020/050853
§ 371 (c)(1),
(2) Date: Jun. 20, 2022

(87) PCT Pub. No.: WO2021/123503
PCT Pub. Date: Jun. 24, 2021

(65) Prior Publication Data
US 2022/0381687 A1      Dec. 1, 2022

(30) Foreign Application Priority Data
Dec. 19, 2019    (FI) ..................................... 20196108

(51) Int. Cl.
*G01N 21/47*    (2006.01)
*G01N 21/53*    (2006.01)

(52) U.S. Cl.
CPC ......... *G01N 21/474* (2013.01); *G01N 21/534* (2013.01); *G01N 2021/4757* (2013.01)

(58) Field of Classification Search
CPC .... G01N 21/49; G01N 15/02; G01N 21/8507; G01B 11/25
See application file for complete search history.

(56) References Cited

U.S. PATENT DOCUMENTS

2013/0154149 A1* 6/2013 Binhussain .......... B29C 67/243
                                                              264/128
2013/0342684 A1* 12/2013 Keranen ............ G01N 15/0205
                                                              356/335
(Continued)

FOREIGN PATENT DOCUMENTS

CN         106872472 A1 *  6/2017
CN         109459444 A      3/2019
(Continued)

OTHER PUBLICATIONS

Bay Area Reefers Forum, "DIY Porthole—Dip your camera lens into the water!", Forum post, Oct. 24, 2015, https://www.bareefers.org/forum/threads/diy-porthole-dip-your-camera-lens-into-the-water.18500/ (Year: 2015).*
(Continued)

*Primary Examiner* — Uzma Alam
*Assistant Examiner* — Justin J Van Cleave
(74) *Attorney, Agent, or Firm* — Laine IP Oy (57) ABSTRACT

The invention concerns method and an apparatus for analyzing the quality and quantity of bubbles or droplets of a dispersed phase in a construction material. The method may be used on construction materials before or during curing of the material, while in a non-solid state with the dispersed phase being entrapped therein. The inventive analyzing includes the steps of:
  applying a first side of an at least partially transparent plate in contact with a sample of said construction material to make a surface of said sample visible through said transparent plate;
  illuminating said surface of said sample through said plate from an opposite second side of said plate with at least one light source;
  providing a photosensitive sensor on said second side of said plate for receiving light reflected from said sample through said transparent plate,
(Continued)

receiving from said photosensitive sensor electrical signals corresponding to said received reflected light and rendering from said electrical signals a visual representation of said surface of said sample using an imaging device;

analyzing said visual representation with a computer system, by identifying bubbles or droplets of said dispersed phase from the surface of the sample by a spatial illumination encoding of the sample; and by determining the size and location of identified bubbles or droplets of said dispersed phase.

Finally, an indication of the quality of said construction material is computed, based on the size and distribution of the identified bubbles or droplets of said dispersed phase in said sample.

13 Claims, 3 Drawing Sheets

(56) References Cited

U.S. PATENT DOCUMENTS

| | | | | |
|---|---|---|---|---|
| 2014/0192187 | A1* | 7/2014 | Atwell | G01B 11/25 348/136 |
| 2018/0322686 | A1* | 11/2018 | Kohlbrenner | G01N 21/57 |
| 2019/0011346 | A1* | 1/2019 | Li | G01N 15/0227 |
| 2019/0112228 | A1 | 4/2019 | Ozersky et al. | |
| 2019/0177223 | A1 | 6/2019 | Gaedt et al. | |

FOREIGN PATENT DOCUMENTS

| | | | |
|---|---|---|---|
| JP | H02298837 A | * | 12/1990 |
| JP | H05203597 A | | 8/1993 |
| JP | 10123126 A | * | 5/1998 |
| JP | H10123126 A | | 5/1998 |
| JP | 2005201785 A | | 7/2005 |
| JP | 2006078228 A | | 3/2006 |
| JP | 2014066588 A | | 4/2014 |
| JP | 2014153055 A | | 8/2014 |
| WO | WO2006001127 A1 | | 1/2006 |

OTHER PUBLICATIONS

Digital Photography Review, "Goldfish all gone? Turn that empty tank into an underwater housing", article, Sep. 2, 2013, https://www.dpreview.com/articles/9947678477/goldfish-all-gone-turn-that-empty-fish-tank-into-an-underwater-housing (Year: 2013).*

DIY Photography, "Turn Any Camera Into Underwater Camera With This $10 DIY Periscope", article, Sep. 22, 2018, https://www.diyphotography.net/turn-any-camera-into-underwater-camera-with-this-10-diy-periscope/ (Year: 2018).*

Bohner et al: Digitalisation of the quality control of concrete manufacturing and construction. Concrete—Innovations in Materials, Design and Structures, May 27-29, 2019, pp. 1435-1442.

Hilal et al: On entrained pore size distribution of foamed concrete. Construction and Building Materials, Jan. 1, 2015, vol. 75, pp. 227-233.

* cited by examiner

METHOD AND APPARATUS FOR DETERMINING THE QUALITY OF FRESH CONCRETE OR THE LIKE

FIELD OF INVENTION

The present invention relates to a method for determining a quality property of mineral or cement-based building materials or the like. More specifically, the invention relates to a method for analyzing the quality, quantity and spatial distribution of gas bubbles in mineral or cement-based building and construction materials, such as concrete, mortars, screeds, grouts, limes and slurries.

BACKGROUND OF THE INVENTION

Hardening of concrete is a chemical process involving hydration between water and cement or a similar binder. During hydration, calcium silicate hydrate gel forms and binds all the concrete constituents together. Successful curing of concrete depends of a complex set of physical parameters and ingredients of the concrete. The quality, size, quantity and location of gas bubbles are important. For example, the spatial distribution of gas bubbles is important, and a spacing factor may be used which describe the distance between the bubbles. The average distance need to be within certain limits to ensure the concrete is frost resistant.

A variety of tests have been developed for the uncured concrete, to ensure the strength and quality of the finished product. Such tests, all known to one skilled in the art, include measuring the temperature of the concrete, the slump test, the compaction Factor test, the vee-bee consistometer test, the flow table test, and the air content test.

A commonly used prior art method for determining the air content of fresh concrete is using an air content meter. The meter is a container with interconnected upper and lower chambers. A sample of concrete is placed into the lower chamber in layers, each layer being fully compacted by hand or by vibration. In the upper chamber the air is pressurized. The concrete inside the lower chamber then becomes compressed, and the volume reduction of the concrete which follows during compression leads to a pressure drop in the upper chamber. This pressure drop is proportional to the total air content in the concrete sample.

For hardened concrete, the air content and the spacing factor are determined at thin sections of a concrete sample using a microscope. The number and size of air bubbles, and their distance between each other are determined along defined measuring lines. This is done manually, or by the use of digital image processing tools.

SUMMARY OF THE INVENTION

The invention relates to a method for analyzing the quality (size, shape) and quantity (size, shape, spatial distribution, distance between adjacent bubbles) of gas bubbles (including air voids and droplets) in mineral or cement-based building and construction materials, such as concrete, mortars, screeds, grouts, limes and slurries. The inventive method works at any stage after mixing the concrete until it starts setting/hardening. The method may be used before casting, which is the process to fill a formwork, or even after casting, as long as the material has not started its hardening process.

In the following, the term bubble will be used for any type of gas or water bubble, air void, droplet, cavity, filled with any type of gaseous or liquid fluid. Furthermore, the term concrete will be used representative for any binder-based and mineral based material as e.g. mortars, grouts, limes, screeds, slurries or the like.

According to one aspect of the invention, a method for analyzing the quality and quantity of bubbles or droplets of a dispersed phase in a construction material is provided. The method may be used on construction materials before or during curing of the material while in a non-solid state and with the dispersed phase being entrapped therein. The inventive analyzing method includes the steps of:

applying a first side of an at least partially transparent plate in contact with a sample of said construction material to make a surface of said sample visible through said transparent plate;

illuminating said surface of said sample through said plate from an opposite second side of said plate with at least one light source;

providing a photosensitive sensor on said second side of said plate for receiving light reflected from said sample through said transparent plate, receiving from said photosensitive sensor electrical signals corresponding to said received reflected light and rendering from said electrical signals a visual representation of said surface of said sample using an imaging device;

analyzing said visual representation with a computer system functionally connected to said imaging device to at least:
  identifying bubbles or droplets of said dispersed phase from said surface of the sample by a spatial illumination encoding of the sample;
  determining the size and location of identified bubbles or droplets of said dispersed phase; and
computing an indication of the quality of said construction material based on the size and distribution of the identified bubbles or droplets of said dispersed phase in said sample.

According to a second aspect of the invention, an apparatus is provided for analyzing the quality and quantity of bubbles or droplets of a dispersed phase in a construction material before or during curing of said dispersion while in a non-solid state with the dispersed phase entrapped therein. The inventive apparatus comprises at least an at least partially transparent plate with a first side to be placed in contact with a sample of said construction material, in order to make a surface of said sample visible through said transparent plate;

at least one light source for illuminating said surface of said sample through said transparent plate from an opposite second side of said plate;

a photosensitive sensor located on said second side of said plate for receiving light reflected from said sample through said transparent plate;

an imaging device arranged to receive from said photosensitive sensor electrical signals corresponding to said received reflected light and to render from said electrical signals a visual representation of said surface of said sample;

a computer system functionally connected to said imaging device, wherein said computer system comprises at least one processing core, at least one memory including computer program code, at least one memory and the computer program code being configured to, with the at least one processing core, cause the apparatus at least to:

identify bubbles or droplets of said dispersed phase from said surface of the sample by a spatial illumination encoding of the sample;

determining the size and location of identified bubbles or droplets of said dispersed phase; and to compute an indication of the quality of said construction material based on the size and distribution of the identified bubbles or droplets of said dispersed phase in said sample.

In some embodiments, the construction material is concrete and said dispersed phase comprise air bubbles. In some other embodiments, the construction material is a polymer resin and said dispersed phase comprise gas bubbles. In some further embodiments, the construction material is a polymer and said dispersed phase comprise droplets of polymer monomers in a dispersion.

The at least partially transparent plate, which may be made of glass, may be contained in a probe housing which is in contact with said construction material sample, in order to collect visual data from a surface of the sample. According to some embodiments, the sample is illuminated with at least two light sources from different directions, which may have different colors.

Multiple sets of visual data, each resulting in a visual representation of a surface of a sample may be collected over time in different lighting conditions when at least part of the light sources are switched on an off as controlled by the computer system. In some embodiments the sample may at least partly be illuminated with an optical spatial pattern produced by a projector, a LED array or a light refracting device such as a prism. With a visual representation is meant in the context of the present disclosure any kind of image of a sample surface created by collecting and processing light that has been reflected from the sample surface.

The various embodiments of the invention are characterized by what is stated in the appended claims.

The invention offers considerable advantages. It is a nonintrusive probing method with which a quality control check of the concrete in fresh state can be done intermittently or continuously during the concrete mixing, transport as well as before, during and after casting. It can also be used as an assessment tool for determining the concrete composition and concentrations of constituents (such as fibers) and chemicals mixed into the concrete.

Statistical information about air bubble size distribution and their spatial location may be used for assessing the quality of the concrete with regards to durability and mechanical properties. The inventive method produces valuable information on the air bubbles inside the concrete, which may be used to estimate the air volume and the spacing factor of the fresh concrete before, during and after casting. As mentioned above, the spacing factor describes the distance between bubbles and is of crucial importance for the frost resistance of the concrete. The present invention thus offers a great advantage over prior art methods that can only determine air volume in fresh concrete.

The invention would thus give concrete manufacturers, builders and concrete component suppliers a competitive advantage, both in assuring quality of ongoing building projects and in product development and production.

DETAILED DESCRIPTION OF EMBODIMENTS

Figure 1:
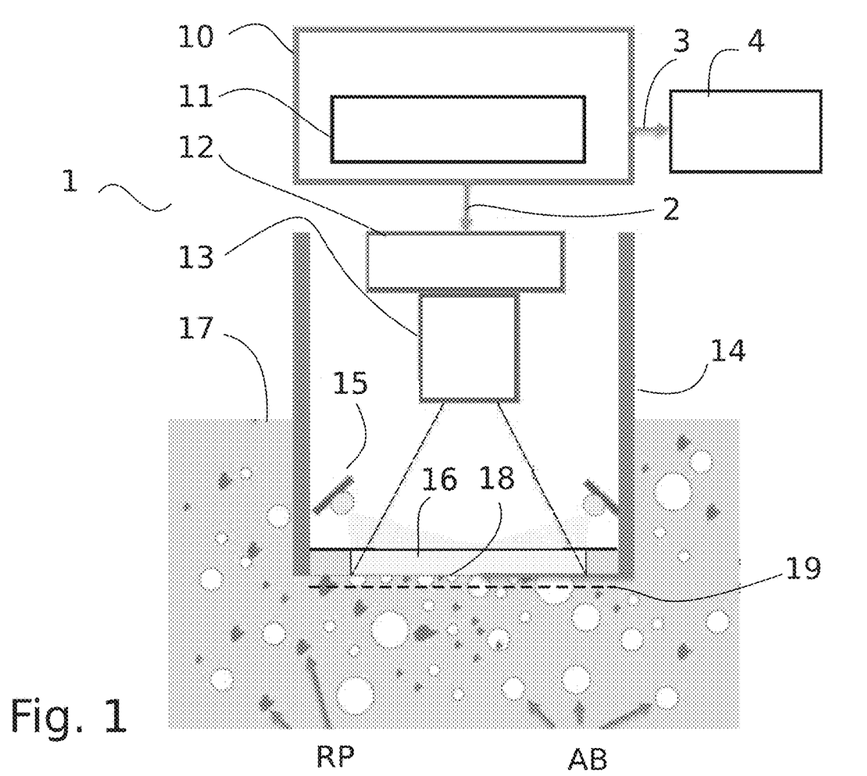
FIG. 1 shows a schematic view of an arrangement capable of carrying out one embodiment of the invention.

FIG. 1 illustrates an example sampling device 1 capable of supporting at least some example embodiments. A computer system 10 is provided having an image analysis software stored in a memory unit 11. The computer system is controlling (see arrow 2) an imaging device 12 having a photosensitive sensor (not shown) and optics 13, which may be a microscope optical system. The photosensitive sensor and the imaging device may be integrated to a camera 12, and it receives light reflected from a sample, as explained below.

The camera 12 and the optics 13 may in some embodiments be located in a housing 14 of the sampling device 1. The housing is partly submerged in fresh concrete 17 and may be located in a suitable vessel (not shown), such as a probing cell or in a conduit. The measurement probe may in some embodiments be an attachment to a concrete conduit or a pipe for on-line testing of the concrete. In other embodiments, it may be a separate rod-like probe for on-line or off-line testing of the concrete in a tank, or in the formwork etc. In some embodiments, the photosensitive sensor may be located in a probe and have a remote connection to an imaging device. The inventive measurement probe may give on-line information about the gas bubbles and would be a replacement for any lab tests in use hitherto.

At the bottom of the housing 14 is a transparent glass plate 16, which allows for illuminating the concrete by at least one illuminator 15. It is clear that the illuminators may be of various kinds, such as LED lights or based on any other appropriate technology, they can be of different colors, and they can be built using optical components such as mirrors, prism, filters, gratings, films etc.

Obviously and without departing from the invention, a camera could also capture visual data from behind a transparent plate beneath or at the side of a concrete surface. In the first instance the concrete would then flow on top of the plate, e.g. through a pipe in a concrete pump.

A machine vision based probe may be used to create a visual representation of the concrete mass. Air bubbles AB in the concrete behind the glass plate 16 and which are in contact with the probe and which are within the illumination field 18 are highlighted by a special illumination 15. The illumination field may roughly correspond to the horizontal area of the glass plate 16. Image analysis which may include pattern recognition techniques, are used by the computer system to detect the bubbles AB and differentiate them from other particles RP, such as aggregates, cement or binder particles, fillers, fibers etc.

The image analysis software used in the present invention is used to detect the optical properties of gas bubbles. The bubbles AB in an image captured through the glass 16 will reflect light and act as small mirrors; the reflections of each of the bubbles can be received by a photosensitive device and processed in an imaging device to create an image with a characteristic illumination pattern. The illumination may also be arranged to produce several and overlayed characteristic patterns on top of each other, as discussed below.

Other particles will not reflect but absorb or diffusely reflect the light and will provide dark spots or a diffuse background in the illumination pattern.

In the task of detecting air bubbles from the other objects in concrete, the reflectivity of air bubbles is a key parameter. An image showing an illumination pattern of the concrete achieved either by evenly lighting the concrete or by various spot illuminators, provides a spatial illumination encoding. Spatial illumination encoding means in this context a resulting pattern of the illuminated objects, based on their reflectivity and their differences, creating contrasting patterns in the image. Spatial illumination encoding may also include information detecting different color and wavelengths of the light.

With digital imaging techniques it is possible to measure the characteristics of bubbles, such as their statistical size distribution, spatial distribution including the distance between bubbles and their shape factors, like roundness and coarseness. The shape properties may be computed from the outlines of the bubbles. Based on this information, it is possible to estimate the total gas or air volume in the concrete respectively.

In one embodiment of the invention, an image analysis system may consist of an imaging device 12 that takes images of the concrete 17, Illuminated by illuminators 15, two of them arranged in this exemplary embodiment on the opposite side of the housing 14. The illuminators 15 may for example consist of LED lamps or arrays, diode lasers, Xenon lights or halogen lights. The light may be constant or intermittently flashing (strobe light). The used light may also be of any desired colors, in order to best bring the form and features of the bubbles visible to the camera.

In some embodiments, the illumination field 18 may be illuminated from more than two directions through the glass plate 16, that separates the concrete from the sampling device 1.

The imaging device that can be used in the present invention may consist of a color CCD camera 12 equipped with a high-magnification lens, achieving a micrometer resolution, for example. Constant or pulsed high-power LED lights are preferably utilized to illuminate the concrete. Visual representations of the concrete and the spatial illumination encoding derivable therefrom are then analyzed and may provide statistical or time-dependent information on the bubble concentration and the size, color and shape of the bubbles. The imaging device may be focused at a plane 19 which is slightly below the lower surface of the glass plate 16.

One example of such an imaging device is the ImperX™ BobCat color camera with an Ethernet connection and a Sony® ICX-285 CCD sensor. Such a photosensitive sensor may provide 14-bit images with a 1392×1040 pixel resolution. The recorded images may be stored as BMP-files. Different materials and particles may require different camera sensors, and it is thus clear to one skilled in the art to apply camera sensors with an appropriate pixel resolution, S/N ratio and sensitivity to various wavelengths of light, to obtain the best results.

In FIG. 1, the computer system 10 may comprise, for example, a single- or multi-core processor wherein a single-core processor comprises one processing core and a multi-core processor comprises more than one processing core. The computer system 10 may in itself comprise an industrial or general-purpose computer having a processor or processing core that runs the analysis software required for camera control, visual data processing and image rendering. Alternatively, the computer system may be distributed, so that the visual data or images are collected with a sampling device 1 comprising a camera controller, such as a micro controller or a programmable logic controller (PLC), whereby the analysis of visual data and/or images are done in a remote computer 4. In the context of the present disclosure, the exact computer configuration is not essential to carry out the invention, and any circuitry and/or wireless communication system (arrow 3) may be used for transferring data between a sampling device 1 and the remote computer system 4.

A processing core may comprise, for example, a Cortex-A8 processing core manufactured by ARM Holdings, a Steamroller processing core produced by Advanced Micro Devices Corporation, or at least one Qualcomm Snapdragon and/or Intel Atom processor. The computer system 10 may comprise at least one application-specific integrated circuit, ASIC, or at least one field-programmable gate array, FPGA.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

As a further example, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular wireless device, or other computing or network device.

Further components of the computer system may be a touchscreen user interface, one or several communication units and the internet. The image analysis software may analyze collected visual data and based on the gathered spatial illumination encoding information from the concrete 17, the software may classify the found bubbles and solid particles and compare it with stored information from a digital library of stored spatial illumination encodings, located in the memory 11. Particularly the bubble size distribution may be compared to a predetermined optimum bubble size distribution value.

In the following image analysis algorithms are described in some detail. An imaging device with a photosensitive sensor used in the present invention is required to produce high quality digital visual representations or images of small and even micro-scale objects in a concrete sample. An automatic and robust image analysis method is needed to detect and analyze the various objects in the images in order to obtain acceptable and comparable results that reveal the main characteristics of the bubbles in the sample. Some essential or useful steps will be presented in detail in the section to follow. The steps described are intended to disclose an exemplary toolbox of analysis algorithms that may be used in the inventive gas bubble recognition and characterization method and apparatus. The disclosure herein is thus not intended to be a list of fixed or exhaustive steps or algorithms necessary for bubble recognition and characterization in the image analysis software stored in the memory unit 11.

Image filtering is utilized to remove noise, to even out differences in the background, to highlight the regions of focused objects at level 19, and to compute image greyscales, such as local greyscale gradient values and their directions. The focal plane, here represented by a dashed line 19, may be vertically adjustable by the optics 12, 13. The image may first be equalized by subtracting and then dividing a low-pass filtered image generated with a Gaussian multiresolution pyramid. This approach effectively evens the image background and removes large blurred objects from the image.

A Laplacian image may then be computed from the equalized image and an absolute Laplace transform value computed. Laplacian image highlights the regions of the greatest greyscale variance, for example objects with sharp texture, small objects and sharp outlines. Focus discrimination may be realized on the Laplacian image with a user-defined minimum focus threshold.

In some embodiments of the invention, a blob detection is thus conducted using a Laplacian detector with different scales, detecting all separate dark blobs in the image, such as bubbles and aggregates.

The gradient image, which is the hypotenuse of the greyscale gradients in the x- and y-directions, may then be multiplied with a user-defined gradient-multiplier value, before superimposing it on a high-pass filtered image.

Image segmentation methods try to automatically recognize focused objects in an image, and to compute their projective areas and silhouettes, i.e. their outlines. Image segmentation is usually carried out in steps, in order to be able to recognize different types of objects. Bright or dark regions may be recognized from an equalized image by using a greyscale percentile threshold.

According to at least some embodiments of the invention, the particles may be classified according to the spatial illumination pattern to bubbles and non-bubbles. A binary image of an object may be obtained by segmenting the image with a user-specified contrast threshold and by superimposing on it an appropriate region from an object image library. A spatial distribution of gas bubbles across the image may then be computed.

According to at least some embodiments of the invention, the size and location of the bubbles may be carried out through a captured image sequence, and the relevant statistics is computed as a basis for the quality determination.

In particle characterization, a binary image of an object may be processed with morphological operations to determine for example its actual boundaries and the shape of the object. Aspect ratio, roundness, and coarseness are usually interesting input parameters for further analysis and object classification of the object. First, the projective area of each object is imaged by the camera. The diameter d of an object may be defined based on the object's projective area A as:

$$d = 2 \cdot \sqrt{\frac{A}{\pi}} \quad (1)$$

Principal axes and aspect ratio are computed from the particle image by using a principal component analysis (PCA) algorithm. The algorithm returns the major and minor axes of the particle and their orientation angle. The aspect ratio is the ratio between the major and minor axes. The aspect ratio of a circle (bubble) is thus=1.

Roundness of an object determines how circular the particle is. Round objects have 100% roundness and as the roundness percentage decreases with increasing the complexity of the particle shape, it shows how much a particle outline shape deviates from a circle. Roundness R may be computed as:

$$R = \left(1 - \frac{\sqrt{\frac{\sum_{i}^{N}(r_i - r)^2}{N-1}}}{r}\right) \cdot 100\% \quad (2)$$

where r is the object radius and $r_i = \sqrt{(x_i - x_c)^2 + (y_i - y_c)^2}$ are the distances from outline pixels $(x_i, y_i)$ to the center point of the object $(x_c, y_c)$. Normalization is obtained by dividing the standard deviation of radii with the object radius, which produces a scale that is inversely proportional to changes in sizes, making the comparison of shapes easier.

Coarseness of an object is computed as the sum of discrete curvatures along the perimeter divided by the length of the outline. Discrete curvature values are computed as the difference between greyscale gradient direction angles of neighboring outline pixels. Only the discrete curvatures of spikes (i.e. sharp turns) are relevant in a coarseness computation. For example, a spike may be determined to exist when the direction angle changes more than 0.9 rad in a positive direction, or less than 0.5 rad in a negative direction. The outline is studied through directional angles from $-\pi$ to $\pi$. The coarseness value may be normalized with a factor $\pi \times d_{max}$ (maximum dimension of the particle), which is the outline length for a circular particle. Bubbles, droplets and other blobs then obtain low coarseness values, whereas fibers and flocs have higher coarseness values.

Shape parameters for bubbles may not be used in some embodiments of the inventive method, as bubbles and air voids have the tendency to follow a roundish shape. The volume of recognized bubbles may then be computed using e.g. an equivalent sphere model or fitting an ellipse to a detected boundary.

The texture of a particle image is important for bubble recognition. The particle texture may be modeled by studying the brightness (i.e. greyscale) profile from bubble center point to its outline, covering the full bubble area. The standard deviation of the brightness values may also be computed. The mean brightness value may be used to discriminate particles to bright (bubbles) and dark (not bubbles) particle classes. However, a main feature for discrimination is also the spatial information gathered from the illumination, e.g. change in colour saturation or other colour information. The intensity may not be sufficient alone for particle classification, as intensity peaks due to reflections may occur in all kind of particles.

Particle classification may also rely on a hypercube approach, which means that a particle or object is classified to a particle class when particle's every property remains between the discrete minimum and maximum limits specified for the class. Classification limits can obviously be modified in a configurations-file of the computer system 10 running the image analysis software.

Each detected particle is strived to be classified to one specific particle type or class. Such particle types or classes may include bubbles, air voids, aggregates, sand, cement or other binder particles, micro-particles like powders, fibres and other particles. A particle may be classified as air bubble, if it is brighter than a brightness threshold and fulfills other predetermined size criteria.

A data set including particle sizes and corresponding particle counts is a way to obtain a particle size distribution. A particle size distribution value may be based on any mathematical model derived from such a data set. Thus, a bubble size distribution or any statistical value calculated from the bubble size distribution may be used as a bubble size distribution parameter. The statistical value characterizing the bubble size distribution may be e.g. skewness, kurtosis, quartiles, median and mode.

Alternative or in addition to the mathematical and statistical methods described above that provides fixed and pre-defined classification filters, machine learning and artificial intelligence technologies may be employed. For example, bubble vs. other particle detection and recognition may be achieved with a combination of machine vision and machine learning, using for example neural networks. With these techniques, one may for example be able to increase the accuracy of bubble image recognition, lower data processing time and significantly decrease the number of settings for the identification in comparison with standard recognition methods.

Finally, the computer system 10 may compute the bubble size, spatial and size distribution and send it or display the data for review.

Figure 2:
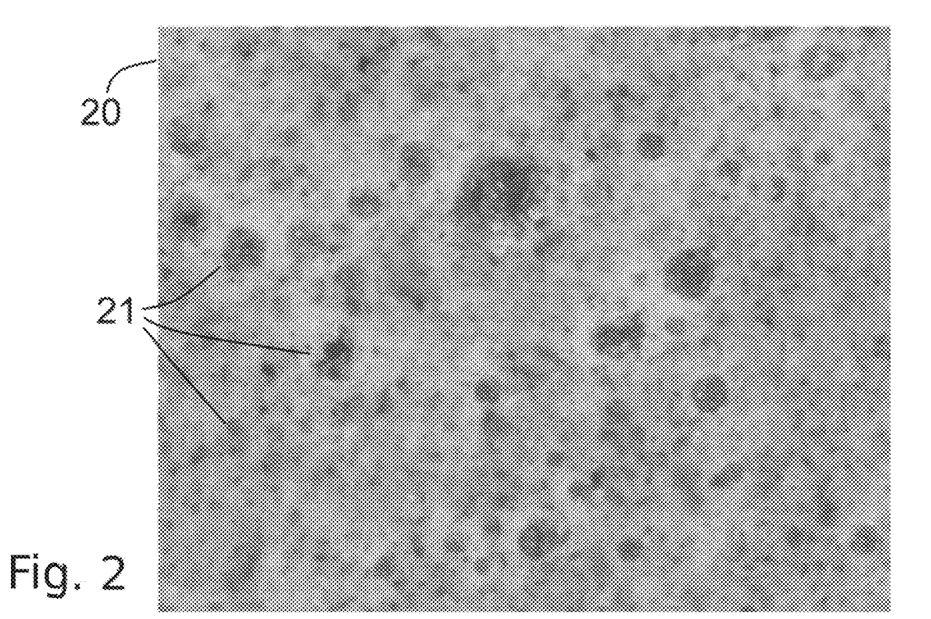
FIG. 2 shows an image of fresh concrete to be analyzed by the inventive method.

FIG. 2 shows an image of fresh concrete 20 to be analyzed by the inventive method. Potential candidate examples for gas bubbles are denoted by reference number 21. As can be seen, they are generally rounded in shape. The inhomogeneous structure of concrete is clearly visible, with aggregates, sand, voids and cavities, and possibly other added constituents.

Figure 3:
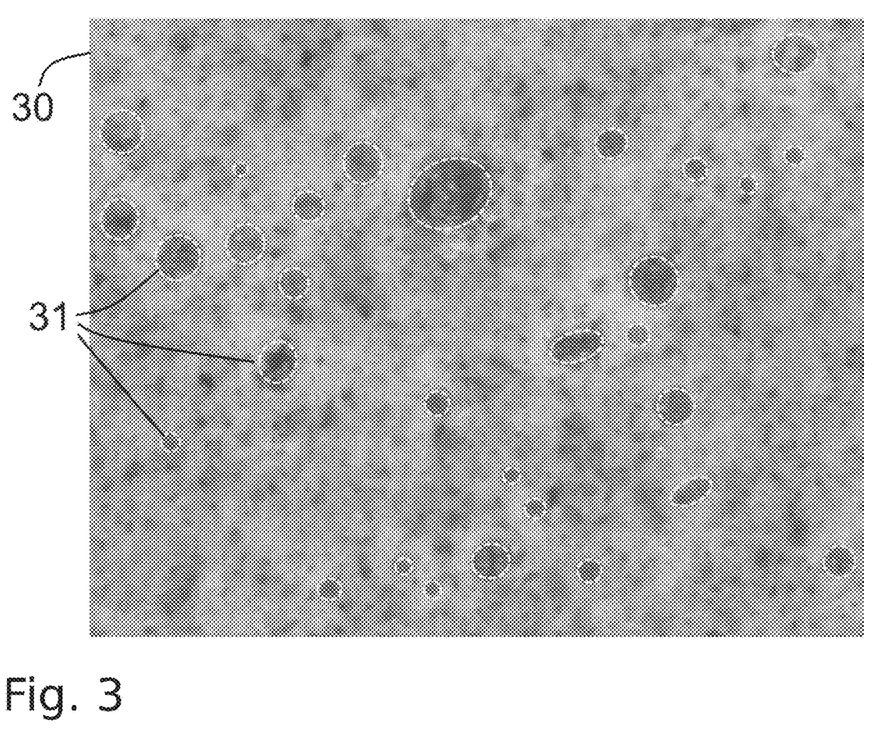
FIG. 3 shows an image of fresh concrete analyzed by the inventive method.

FIG. 3 shows the same image as in FIG. 2 of fresh concrete 30, now analyzed by the inventive method. The analysis result is placed on top (overlayed) on the original picture, and the elements 31 deemed to be air or gas bubbles by the image analysis software are clearly outlined.

Figure 4:
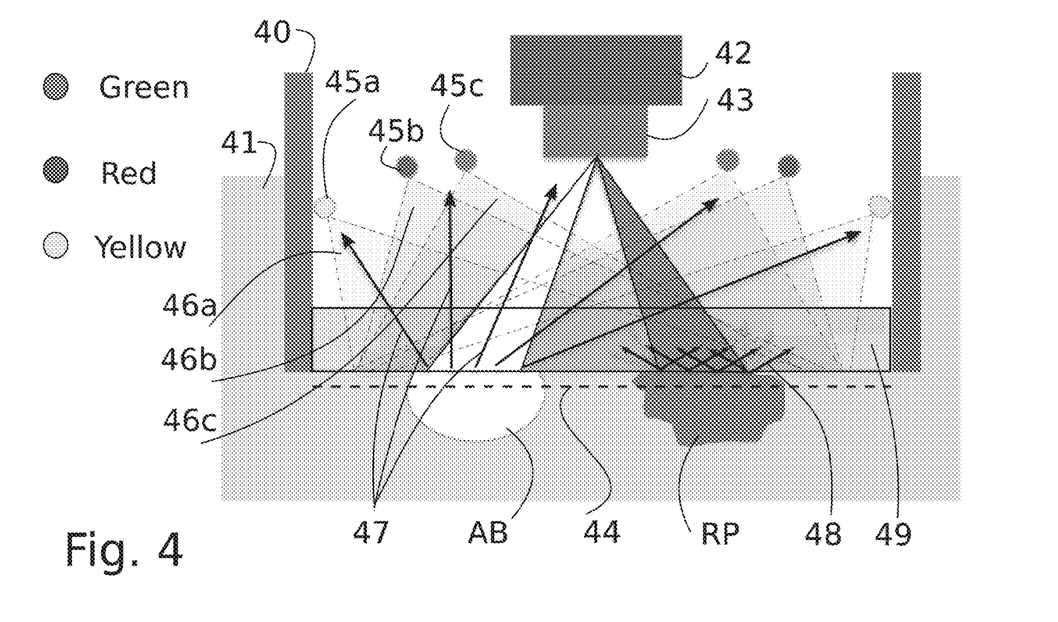
FIG. 4 shows a schematic view of an arrangement capable of carrying out another embodiment of the invention.

FIG. 4 shows a schematic view of an arrangement capable of carrying out another embodiment of the inventive method. In this embodiment, in a housing 40 are located a camera 42 and its optics 43, along with special encoding spot illuminators 45a, 45b and 45c close to the camera 42. The illuminators 45a-45c have different colors, in addition to any general illumination (not shown). In this example, two sets of colored LEDs or other illuminators 45a-45c are placed on opposite sides of the housing, where 45a is yellow, 45b is red and 46c is green, for example. The corresponding beams of light for each led is marked with dashed-line cones and references 46a, 46b and 46c, respectively.

The housing 40 is partly submerged in fresh concrete 41 to have a focal plane 44 of the optics 43 at or at a distance under the glass plate 49 that separates the concrete from the sampling device and the surface of the concrete 41.

The color spectrum of the illuminators affects the colors reflected by the objects, why the LED lights preferably are easily changeable for optimum reflection and detection. For example, the illumination light spectrum may use white LED light for general measuring conditions. White LED lights have a sharp peak at blue wavelengths (460 nm) and a local minimum between the blue and green wavelengths, around 500 nm. Ultraviolet light (UV) may be used for its better image resolution when studying micron-sized particles.

In some embodiments, the illuminators may be placed differently from what is shown in the figures, at different heights or otherwise unsymmetrically with respect to the camera and the focal plane, here represented by a dashed line 44 and which may be vertically adjustable, in order to optimize the amount of reflected light and detection conditions.

In some embodiments, more than one image may be captured with variable illumination, e.g. different colors, or some part of the illumination may be entirely switched on or off. The difference between the taken images may then be analyzed for improved detection of various patterns.

In FIG. 4, the bubbles AB are discriminated from mineral or other dark particles RP in that the bubbles reflect light 47 towards the camera, while dark particles RP scatter the light 48. According to some embodiments, the image analysis software may first perform a "blob detection" which detects all dark areas in the image. Further classification of the blobs may then follow, based on the structural pattern visible, in accordance with methodologies explained earlier.

Figure 5:
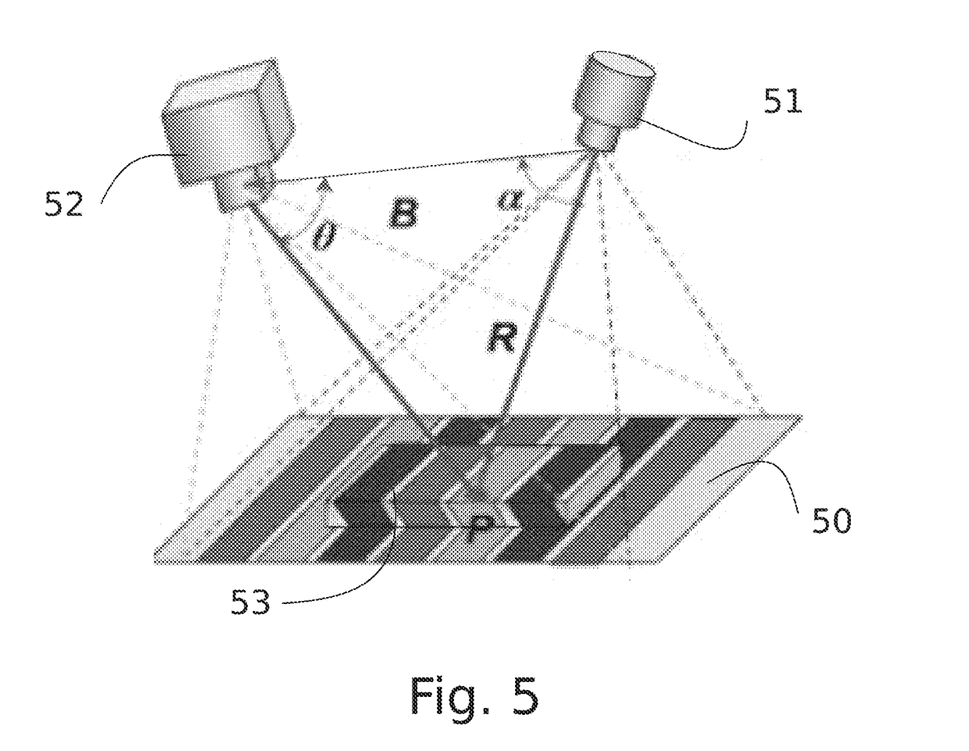
FIG. 5 shows a schematic view of a lighting arrangement in some embodiments of the invention.

In FIG. 5 is shown a schematic view of a lighting arrangement out in some embodiments of the invention. The sample 50 is illuminated with an optical spatial pattern produced by a device 52, which may be a projector, a LED array, or a light refracting device such as a prism. An imaging device 51 for taking images of the sample 50 through a transparent plate 53 is also shown.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the building industry, as well as in oil-in-water emulsion polymerization techniques aimed at producing solid polymer materials.

The invention claimed is:

1. A method for analyzing the quality and quantity of bubbles or droplets of a dispersed phase in a construction material, said method being used on construction materials before or during curing of said material while in a non-solid state with the dispersed phase being entrapped therein, wherein the analyzing includes the steps of:
applying a first side of an at least partially transparent plate in contact with a sample of said construction material to make a surface of said sample visible through said transparent plate; wherein said at least partially transparent plate is contained in a probe housing which is in contact with said construction material sample, in order to collect visual data from a surface of the sample, illuminating said surface of said sample through said plate from an opposite second side of said plate with at least two light sources, which have different colors, from different directions;

providing a photosensitive sensor on said second side of said plate for receiving light reflected from said sample through said transparent plate, receiving from said photosensitive sensor electrical signals corresponding to said received reflected light and rendering from said electrical signals a visual representation of said surface of said sample using an imaging device;

analyzing said visual representation with a computer system functionally connected to said imaging device to at least:

identifying bubbles or droplets of said dispersed phase from said surface of the sample by a spatial illumination encoding of the sample;

determining the size and location of identified bubbles or droplets of said dispersed phase; and computing an indication of the quality of said construction material based on the size and distribution of the identified bubbles or droplets of said dispersed phase in said sample.

2. The method according to claim 1, wherein said construction material is concrete and said dispersed phase comprise air bubbles.

3. The method according to claim 1, wherein said construction material is a polymer resin and said dispersed phase comprise gas bubbles.

4. The method according to claim 1, wherein said construction material is a polymer and said dispersed phase comprise droplets of polymer monomers in a dispersion.

5. The method according to claim 1, wherein multiple sets of visual data is collected over time in different lighting conditions when at least part of said light sources are switched on and off as controlled by said computer system.

6. The method according to claim 1, wherein said sample is at least partly illuminated with an optical spatial pattern produced by a projector, a LED array or a light refracting device such as a prism.

7. The method according to claim 3, wherein said sample is at least partly illuminated with an optical spatial pattern produced by a projector, a LED array or a light refracting device such as a prism.

8. An apparatus for analyzing the quality and quantity of bubbles or droplets of a dispersed phase in a construction material before or during curing of said dispersion while in a non-solid state with the dispersed phase entrapped therein, wherein the apparatus comprising at least:

an at least partially transparent plate with a first side to be placed in contact with a sample of said construction material, in order to make a surface of said sample visible through said transparent plate; said at least partially transparent plate is contained in a probe housing which is in contact with said construction material sample, in order to collect visual data from the surface of the sample, at least two light sources for illuminating said surface of said sample through said transparent plate from an opposite second side of said plate with different colors and from different directions;

a photosensitive sensor located on said second side of said plate for receiving light reflected from said sample through said transparent plate;

an imaging device arranged to receive from said photosensitive sensor electrical signals corresponding to said received reflected light and to render from said electrical signals a visual representation of said surface of said sample; and a computer system functionally connected to said imaging device, wherein said computer system comprises at least one processing core, at least one memory including computer program code, at least one memory and the computer program code being configured to, with the at least one processing core, cause the apparatus at least to:

control the light sources to collect multiple sets of visual data over time in different lighting conditions when at least part of said light sources are switched on and off as controlled by said computer system;

identify bubbles or droplets of said dispersed phase from said surface of the sample by a spatial illumination encoding of the sample; and determine the size and location of identified bubbles or droplets of said dispersed phase; and to compute an indication of the quality of said construction material based on the size and distribution of the identified bubbles or droplets of said dispersed phase in said sample.

9. The apparatus according to claim 8, wherein said construction material is concrete and said dispersed phase comprise air bubbles.

10. The apparatus according to claim 8, wherein said construction material is a polymer resin and said dispersed phase comprise gas bubbles.

11. The apparatus according to claim 8, wherein said construction material is a polymer and said dispersed phase comprise droplets of polymer monomers in a dispersion.

12. The apparatus according to claim 8, wherein said probe housing comprises said at least two light sources for illuminating said sample from different directions.

13. The apparatus according to claim 8, at least one of said light sources comprise a projector, a LED array, or a light refracting device such as a prism, producing an optical spatial pattern.

* * * * *